(12) United States Patent
Junginger et al.

(10) Patent No.: US 11,057,279 B2
(45) Date of Patent: Jul. 6, 2021

(54) METHOD AND DEVICE FOR ASCERTAINING ANOMALIES IN A COMMUNICATIONS NETWORK

(71) Applicant: Robert Bosch GmbH, Stuttgart (DE)

(72) Inventors: Andrej Junginger, Stuttgart (DE); Holger Ulmer, Ulm (DE); Markus Hanselmann, Stuttgart (DE); Thilo Strauss, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/633,635

(22) PCT Filed: Jul. 23, 2018

(86) PCT No.: PCT/EP2018/069884
§ 371 (c)(1),
(2) Date: Jan. 24, 2020

(87) PCT Pub. No.: WO2019/025217
PCT Pub. Date: Feb. 7, 2019

(65) Prior Publication Data
US 2020/0236005 A1    Jul. 23, 2020

(30) Foreign Application Priority Data

Jul. 31, 2017   (DE) .......................... 102017213119.5

(51) Int. Cl.
*G06F 15/173* (2006.01)
*H04L 12/24* (2006.01)
(Continued)

(52) U.S. Cl.
CPC ............ *H04L 41/16* (2013.01); *G06K 9/6256* (2013.01); *G06N 3/0445* (2013.01);
(Continued)

(58) Field of Classification Search
CPC ............... H04L 41/16; H04L 12/40013; H04L 41/0627; H04L 41/0631; H04L 43/50;
(Continued)

(56) References Cited

U.S. PATENT DOCUMENTS

| 2016/0226894 A1 | 8/2016 | Lee et al. |
| 2017/0076116 A1 | 3/2017 | Chen et al. |
| 2017/0126711 A1 | 5/2017 | Jung et al. |

FOREIGN PATENT DOCUMENTS

| DE | 102009026995 A1 | 3/2011 | |
| WO | 2015103514 A1 | 7/2015 | |
| WO | WO-2018228672 A1 * | 12/2018 | ........... G06N 3/0472 |

OTHER PUBLICATIONS

International Search Report for PCT/EP2918/959884, dated Oct. 26, 2018.
(Continued)

*Primary Examiner* — Wing F Chan
*Assistant Examiner* — Joseph R Maniwang
(74) *Attorney, Agent, or Firm* — Norton Rose Fulbright US LLP; Gerard Messina

(57) ABSTRACT

A method for ascertaining an anomaly in a communications network. In a first phase, a discriminator is trained to recognize whether messages transmitted over the communications network are indicative of the anomaly existing; during training, normal data and artificial data produced by a generator are fed to the discriminator, and, in response, the discriminator is trained to recognize that normal data being fed thereto connotes no anomaly, and artificial data being fed thereto connotes an anomaly. In a second phase, the generator is trained to produce artificial data which, when fed to the discriminator, are classified with the greatest possible probability as normal data. In a third phase, contents of messages received over the communications network are fed as an input variable to the discriminator; an output variable
(Continued)

is ascertained, and the decision as to whether the anomaly exists or not being made as a function of the output variable.

11 Claims, 5 Drawing Sheets

(51) Int. Cl.
*G06K 9/62* (2006.01)
*G06N 3/04* (2006.01)
*H04L 12/40* (2006.01)
*H04L 12/26* (2006.01)
*H04L 29/08* (2006.01)

(52) U.S. Cl.
CPC .... *H04L 12/40013* (2013.01); *H04L 41/0627* (2013.01); *H04L 41/0631* (2013.01); *H04L 43/50* (2013.01); *H04L 67/12* (2013.01); *H04L 2012/40273* (2013.01)

(58) Field of Classification Search
CPC .......... H04L 67/12; H04L 2012/40273; G06K 9/6256; G06N 3/0445
See application file for complete search history.

(56) References Cited

OTHER PUBLICATIONS

Ke Wang et al., "Anagram: A Content Anomaly Detector Resistant to Mimicry Attack", 2006, Recent Advances in Intrusion Detecteon Lecture Notes in Computer Science, LNCS, Springer, Berlen, DE, pp. 226-248, XP019042880.

* cited by examiner

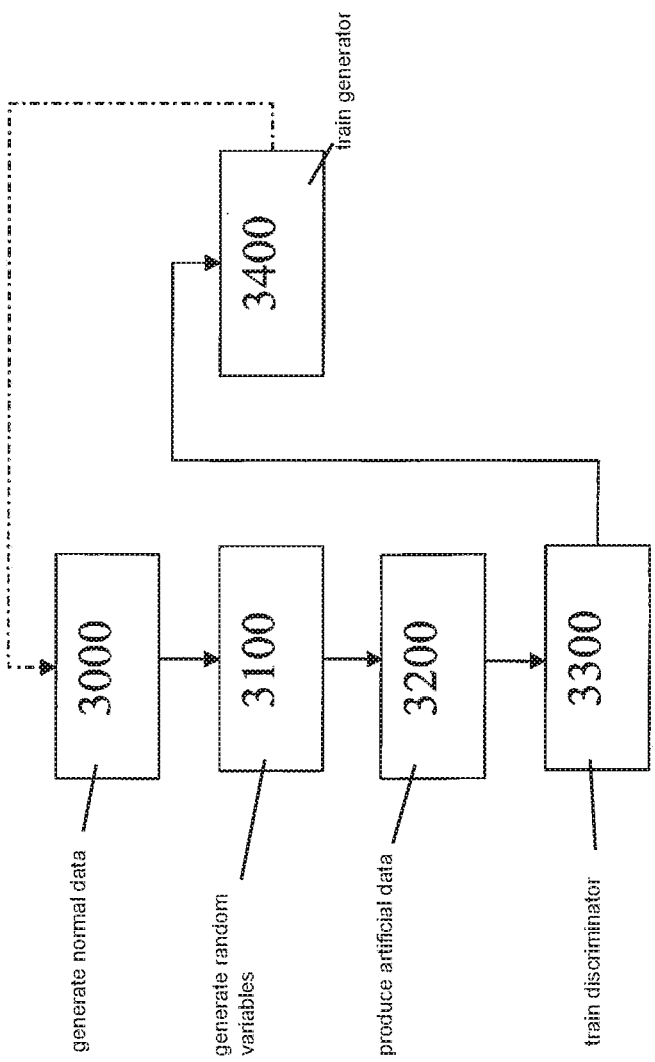

METHOD AND DEVICE FOR ASCERTAINING ANOMALIES IN A COMMUNICATIONS NETWORK

FIELD

The present invention relates to a method and a device for ascertaining whether an anomaly is present in a communications network, to a computer program, and to a machine-readable storage medium.

BACKGROUND INFORMATION

German Patent Application No. DE 10 2009 026 995 A1 describes a method for operating a bus system, in particular a CAN bus. A plurality of stations are connectable to the bus system. A transmitted message has an identifier, it being possible for one specific identifier (for example, IDENT2) to always be used only by one single station. Each of the stations compares the identifier of a transmitted message to the identifiers (for example, IDENT2) it itself uses. In the case of a match, an error message is generated.

SUMMARY

An example method in accordance with the present invention may have the advantage of making it possible to simply and more effectively recognize anomalies in a communications network. Advantageous embodiments of the present invention are described herein.

An important aspect of today's machines, devices and systems resides in the internal and external data exchange thereof. Within a device, data are exchanged, for example, among individual components to render possible the desired interaction thereof (for example, among control units in a motor vehicle). An external data exchange may take place among independent devices of the same type, for example (among a plurality of vehicles that are moving together in the same traffic or among household devices that are communicating with each other within a networked home, for example).

In a real group of communicating systems and devices, the data communication traffic may thereby be basically divided into two groups: the first group, the "normal behavior," that describes the type of data traffic that occurs in normal operation—i.e., without errors, failures, external manipulations or the like. In a properly functioning system, only error-free data occur in such situations, and the individual data are generally mutually dependent due to specific (both steady-state, as well as time-variable) correlations.

The second group, "anomalies," describes the type of data communication traffic that deviates from "normal behavior." For various reasons, deviations from normal behavior may occur in the data during real operation. The reasons for this may be of the following type, for example:
(i) defects or completely failed sensors supply faulty data or no data whatsoever;
(ii) the components are damaged;
(iii) the system was manipulated by an external source (for example, a hacker attack).

It is vitally important to recognize such anomalies since it is possible, for example, to take control of a motor vehicle in such attacks.

It is possible to implement a rule-based method for detecting anomalies. For a selection of possible abnormal behavior, a list of queries, checks and conclusions is created here, on whose basis the system proceeds.

Another possible approach uses a set of sample data that contain additional information about whether it is a question of a normal or abnormal state. Suitable systems, such as neural networks, for example, may then be trained on the basis of these labels (supervised learning) in order to be able to recognize similar states later on.

Here, a difficulty of methods based on rule-based data or data labeled for training is that the nature of a possible anomaly should be known before the occurrence thereof. Alone the special case of a (hacker) attack on a system to manipulate the behavior thereof makes it clear that such an assumption is very costly.

This method has the advantage of making it possible to independently discover anomalies in the data communication traffic of the communications network, there being no need for prior knowledge of the type and formation thereof. Thus, recognition of the anomaly is based exclusively on the knowledge of the normal behavior of the particular system.

The method is based on an unsupervised learning approach, i.e., that exclusively data, which reflect the normal behavior of the system, are required for the configuration, thus, for the training. The training does not require any data containing the attacks, nor special domain knowledge, i.e., the method is independent of the physical or technical importance of the underlying data. For that reason, this system is very readily applicable to other domains.

Moreover, this method may be very readily extended to further communication nodes in the communications network.

In addition, the method advantageously allows categorical data to likewise be considered, for example, by "one-hot-encoding." The method may be used both "online," as well as "offline," i.e., the method may be executed on a control unit installed in the motor vehicle, or also on a diagnostic system outside of the motor vehicle, for example, on an external computer.

Therefore, in a first aspect, the present invention relates to a method for ascertaining whether there is an anomaly, in particular a hacker attack, in a communications network, for example, in a communications network, in particular of a motor vehicle; in a first phase, a discriminator being trained to recognize whether messages transmitted over the communications network are indicative that the anomaly exists;

during training, normal data and artificial data produced by a generator being fed as an input variable to the discriminator; and the discriminator being trained to recognize that normal data being fed thereto connotes no anomaly, and artificial data being fed thereto connotes an anomaly;

in a second phase, the generator being trained to produce artificial data in such a way that, when they are fed to the discriminator, they are classified as highly likely to be normal data (which means that, at best, the discriminator is hardly able to recognize that an anomaly exists when the artificial data produced by the generator are fed thereto);

in a third phase, contents of messages received over the communications network being fed as an input variable to the discriminator; an output variable being ascertained as a function of the input variable, and the decision as to whether the anomaly exists or not being made as a function of the output variable.

As is customary, training, thus, the discriminator or the generator learning in a supervised or unsupervised process means here that the parameters, which characterize the particular system, are adapted with the aid of the current input and output behavior of the system to minimize the loss function, which underlies the training and includes the desired behavior of the system. For this purpose, back propagation may be used, in particular.

Thus, in accordance with the present invention, the generator and the discriminator are allowed to compete against each other in order to thereby gradually improve both. The generator and the discriminator have different tasks: Out of noise, which may have any underlying distribution, the generator produces the artificial data, which may be interpreted as data, for example, that would result if the communications network were attacked (for example, by a hacker). The discriminator has the task of distinguishing between artificial data and normal data and is configured, for example, to allow the result thereof to be interpreted as a probability that normal data are at hand. The generator and the discriminator are trained simultaneously in this case and compete against each other. The generator learns to produce data that become increasingly similar to normal data. On the other hand, the discriminator is increasingly better at distinguishing artificial data from normal data.

Thus, the generator assumes the role of an attacker which continuously attempts during training to find ever new attack strategies that the discriminator does not recognize as such. In return, the discriminator is conditioned by the special training strategy to recognize new attacks or anomalies as such.

An advantageous embodiment may provide that the training of the discriminator in the first phase and the training of the generator in the second phase be alternately repeated several times prior to implementation of the third phase. This means that the two steps of training the discriminator and training the generator are carried out alternately in batch runs, allowing the generator and the discriminator to learn from each other as effectively as possible.

If the discriminator is adequately trained, it may be used, for example, to detect anomalies or also attacks, because it is able to reliably distinguish normal data from anomalous data. The discriminator's prediction on unseen data, may be interpreted as the existence of an anomaly or an attack being probable.

This may be realized by a supervised learning problem being generated from the originally unsupervised learning problem during training of the discriminator. For this purpose, both normal data, as well as artificial data are fed to the discriminator and, during learning, information is taken into account as to which of the input data are normal data and which are not (i.e., labels are generated for the input data). On the basis of the output of the discriminator and the corresponding labels, the parameters of the discriminator may be adapted by back propagation in a way that allows the correct labels to be better predicted.

To train the generator, the entire system, composed of the generator and the discriminator, is considered. Here, the artificially produced data of the generator are fed to the discriminator. The output variable of the discriminator is able to characterize to what extent the discriminator considers the data to be artificial. Using gradient information, this may be back-propagated from the discriminator to the generator, whereby it is known how the parameters thereof need to be adapted to create better strategies for attacking the discriminator. In this step, exclusively the parameters of the generator are adapted.

As described, both steps may be repeated iteratively in order to gradually improve both the discriminator, as well as the generator.

Another embodiment may provide that random variables be fed to the generator and that the generator produce the artificial data as a function thereof.

Here, "random" variables may not only mean that the random variables are selected one time (pseudo) randomly, rather that new random variables are produced in each case prior to the generation of artificial data. Here, any distributions may underlie the random variables. In particular, the random variables may be generated by a (pseudo) random number generator in such a way that they correspond to white noise.

In the first phase, the discriminator is preferably alternately trained using batches that exclusively contain normal data or exclusively artificial data. Such a distribution of the batch runs makes possible a more stable training.

It is self-evident that it is also possible for a batch to contain a mixture of normal data and artificial data.

In particular, at the beginning of the first phase, the discriminator may be initially trained using at least one batch, which exclusively includes normal data.

In other words, the discriminator is preconditioned. For the preconditioning, it is also possible, in particular, that the discriminator be trained using a plurality of batch runs, which exclusively include normal data. A preconditioning may make the training of the discriminator especially efficient.

It is possible that discriminators and/or generators are implemented as a machine learning system, in particular as a (possibly deep) neural network. However, this is not necessary. It is possible to use any parameterizable and differentiable functions for both the discriminator and also for the generator.

Here, a deep neural network includes at least two layers and, in particular is able to simulate complex and non-linear functions. Greatly differing forms of neural networks are possible. Possible types include feed forward, recurrent convolutional, deconvolutional, LSTM, or combinations thereof.

In other aspects, the present invention relates to a computer program that is adapted for executing one of the aforementioned methods when it is executed on a computer, a machine-readable storage medium upon which this computer program is stored (this storage medium self-evidently being configurable in a spatially distributed manner, for example, distributed over a plurality of computers in the case of a parallel design), and relates to a device, in particular a supervision unit, that is adapted for executing one of these methods (for example, by playing back the aforementioned computer program).

Specific embodiments of the present invention are explained in below with reference to the figures.

BRIEF DESCRIPTION OF THE DRAWINGS

FIG. 5 shows a flow chart of a specific embodiment of the method for training the discriminator and the generator.

DETAILED DESCRIPTION OF EXAMPLE EMBODIMENTS

Figure 1:
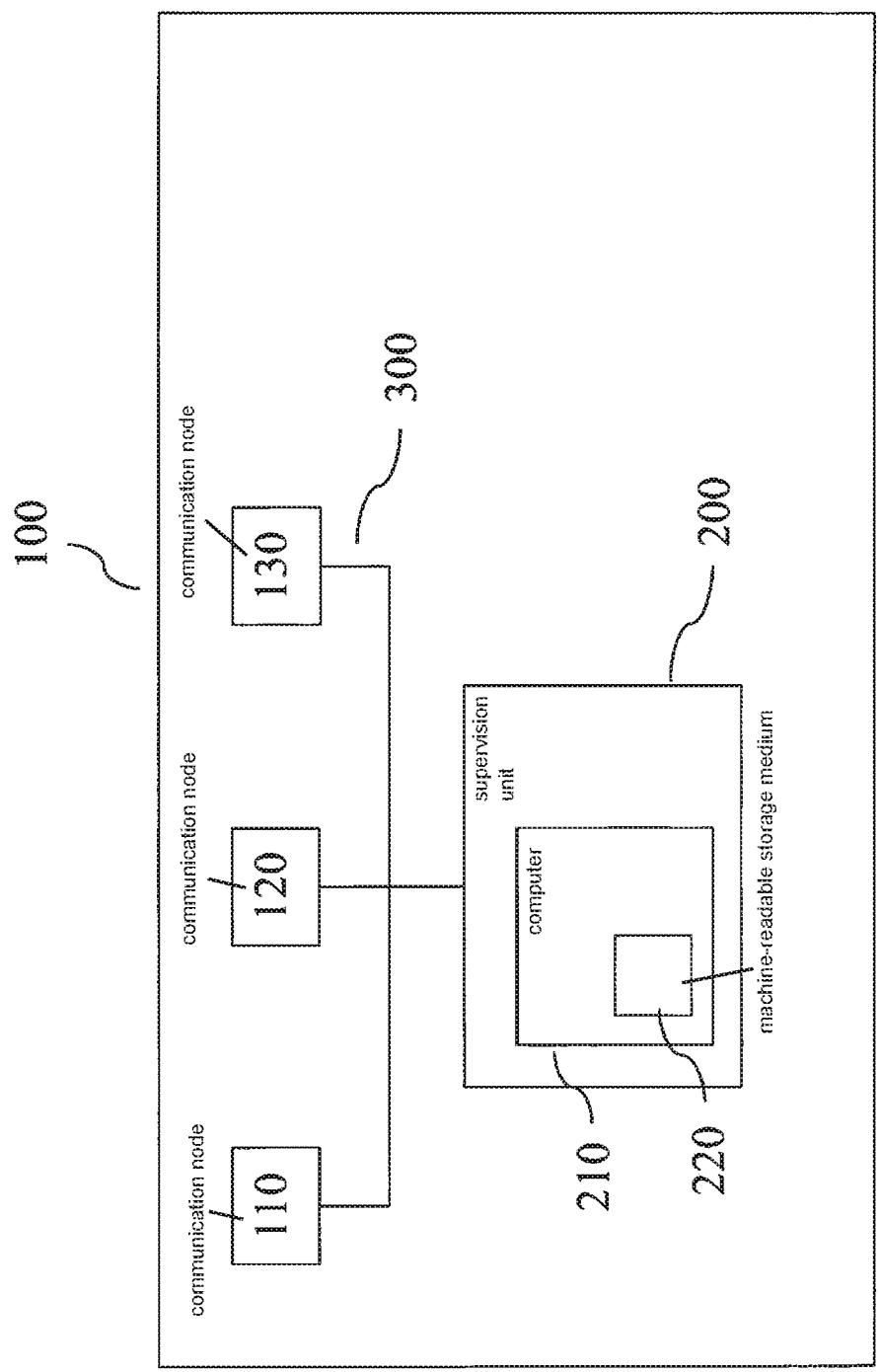
FIG. 1 schematically shows a communications network in a motor vehicle.

FIG. 1 shows an exemplary communications network in a motor vehicle 100. The communications network is provided in this example by a CAN bus 300 via which communication nodes 110, 120 and 130 may communicate with each other by exchanging messages. Supervision unit 200 is likewise connected to CAN bus 300 and may also receive messages sent by communication nodes 110, 120, 130 and, if necessary, may itself send a message to CAN bus 300 to initiate countermeasures in response to detection of an anomaly.

The present invention is not limited to a CAN bus. Instead, it may also be used in motor vehicles where another bus, in particular a field bus, or a combination of a plurality of bus systems, is present.

Supervision unit 200 features a computer 210 which has a machine-readable storage medium 220. On this machine-readable storage medium 220, a computer program may be stored that contains instructions which, when executed by computer 210, execute the inventive method, in particular the method illustrated in FIG. 6. It is self-evidently also possible that parts of the method or the entirety thereof be implemented in hardware.

Figure 2:
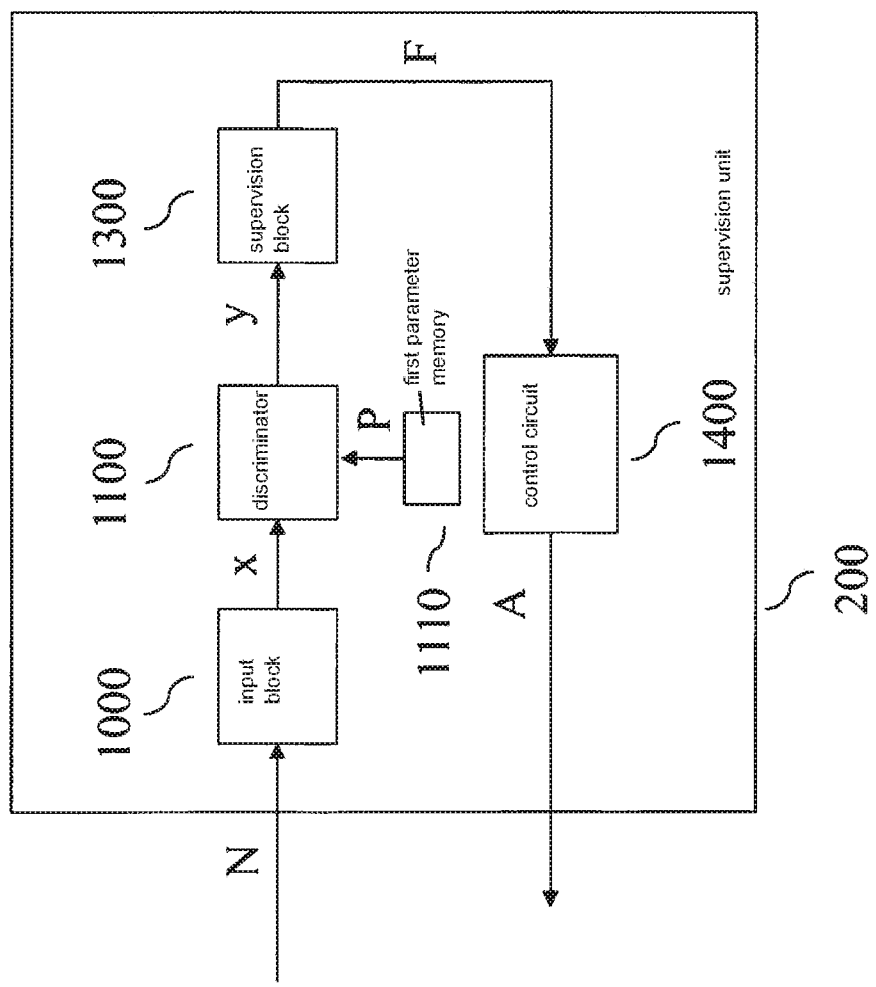
FIG. 2 schematically shows a signal flow in the supervision unit.

FIG. 2 illustrates the signal flow within supervision unit 200. A message N, received by supervision unit 200 via CAN bus 300, is fed to an input block 1000. From the message, the input block extracts an input variable x, for example, useful data content (payload) and/or metadata of message N. This input variable is fed to discriminator 1100, which ascertains output variable y herefrom. Output variable y is able to quantify a probability that an anomaly exists in the communications network. Discriminator 1100 is parameterized by parameters P that are provided by a first parameter memory 1110.

Output variable y is fed exemplarily to a supervision block 1300, which, as a function thereof, ascertains an error signal F. Error signal F characterizes whether an anomaly exists in the communications network, thus in the communication among communication nodes 110, 120, 130 via CAN bus 300 or in supervision unit 200. For example, error signal F may be a binary encoded signal, for example, "0"="no anomaly exists," "1"=an anomaly exists. Error signal F may be set to value "1," for example, when the value of output signal y exceeds a predefinable threshold value.

Error signal F is optionally fed to a control circuit 1400, which ascertains a control variable A herefrom that is transmitted via CAN bus 300 to one or a plurality of communication nodes 110, 120, 130 of the communications network.

For example, it is possible that motor vehicle 100 is switched to a safe state. If motor vehicle 100 is an autonomous vehicle 100, a driver may be prompted to again take control thereof. It is alternatively or additionally possible that the communication via CAN bus 300 be restricted to essential messages.

If error signal F already contains specific information about the cause of the anomaly, control variable A may initiate a specific countermeasure, such as cutting off one of communication nodes 110, 120, 130 from the data communications traffic over the CAN bus.

Figure 3:
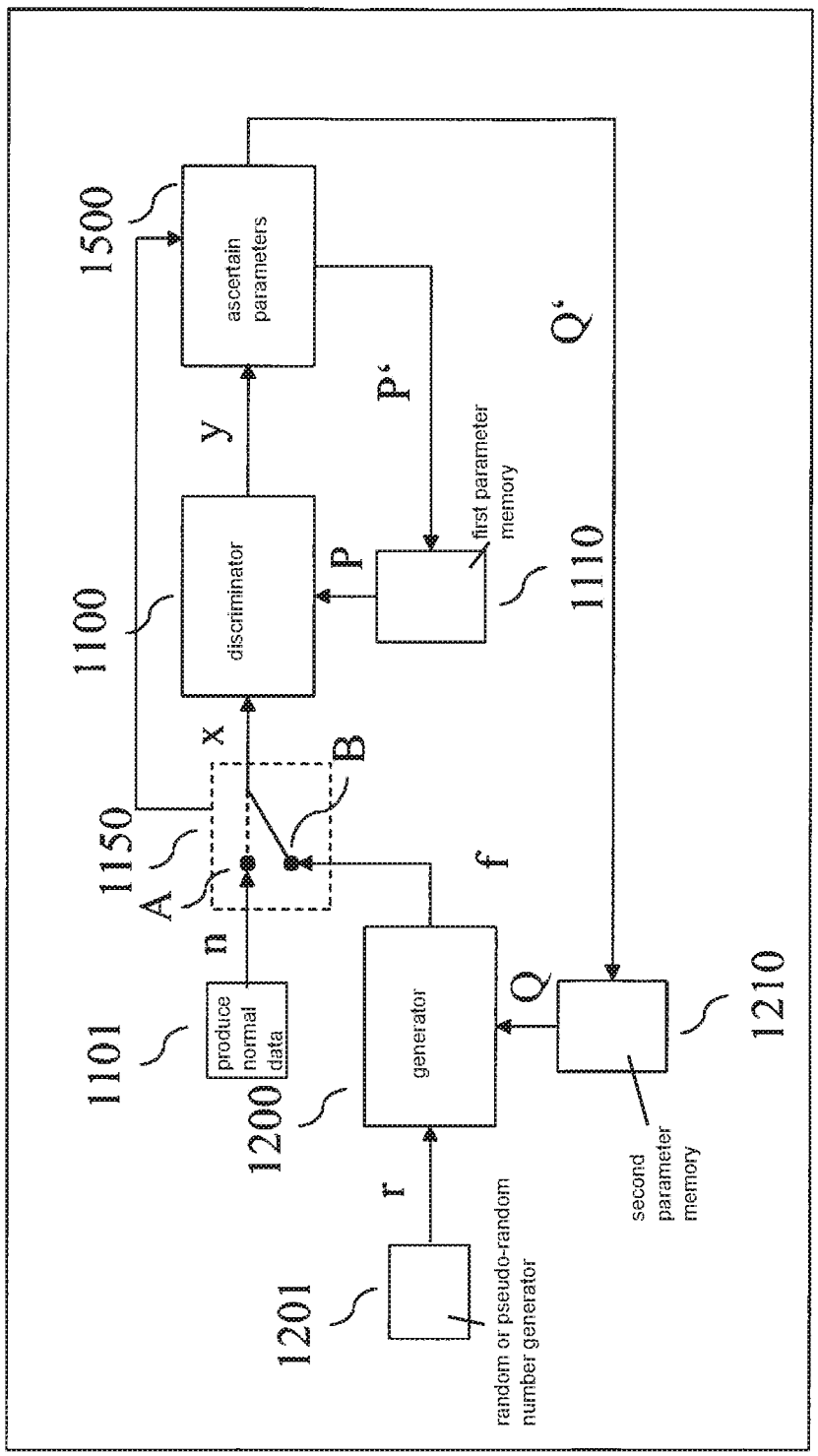
FIG. 3 shows an exemplary device of a system for training the discriminator and the generator.
Figure 4:
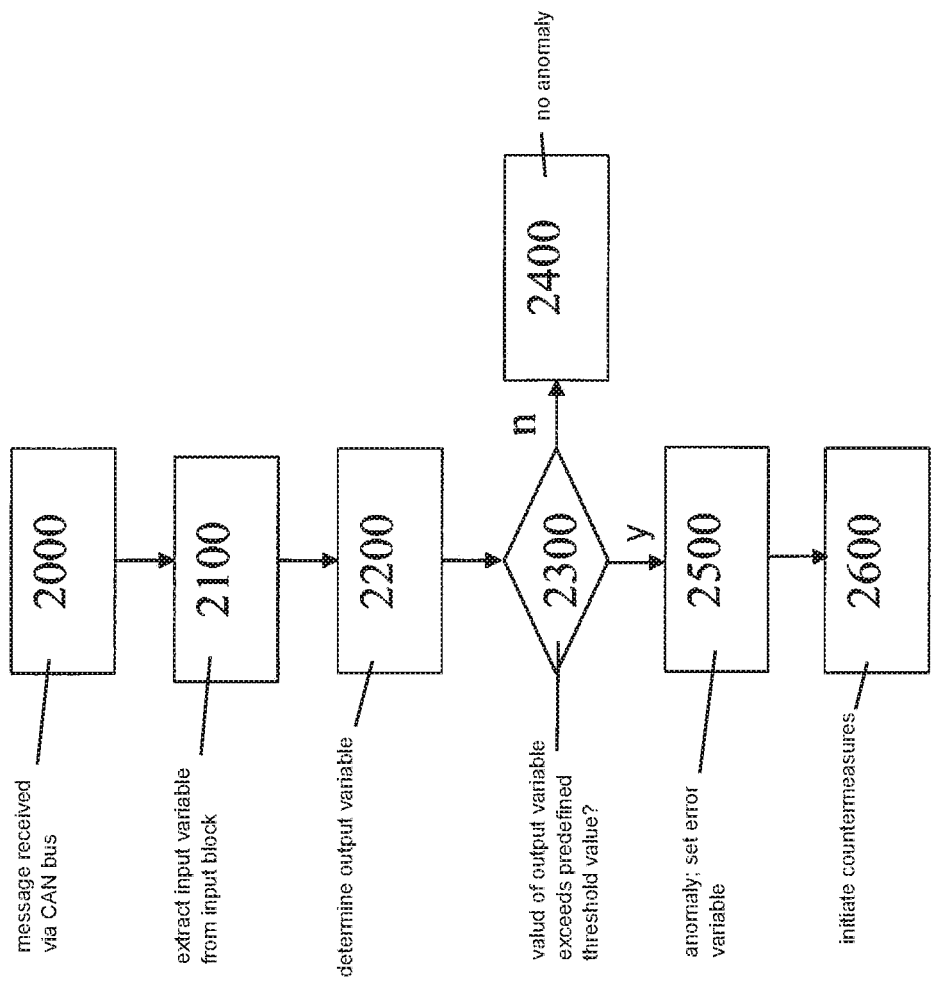
FIG. 4 shows a flow chart of a specific embodiment of the method for detecting anomalies.

FIG. 3 illustrates the configuration of a device 400 for training discriminator 1100 in accordance with a specific embodiment. Device 400 may be implemented as a computer program and realized on machine-readable storage medium 220 of supervision unit 200. However, it may also be implemented in a separate device, for example, as a computer program that is executed on a personal computer.

A switch 1150 may be used to select which data are fed to discriminator 1100 as input data. Normal data n, which are produced by a block 1101, for example, by reading out of the same from a data file, are fed to discriminator 1100 as input data x in a first switch position A.

In a second switch position B, artificial data f, which are produced by a generator 1200, are fed to discriminator 1100. Generator 1200 produces artificial data f as a function of random variables r, which are fed thereto by a block 1201. Block 1201 may include a pseudo-random number generator, for example, or a random number generator (implemented in hardware, for example).

Discriminator 1100 is parameterized by first parameters P that are provided by a first parameter memory 1110. Generator 1200 is parameterized by second parameters Q that are provided by a second parameter memory 1210. First parameter memory 1110 and/or second parameter memory 1210 may be dedicated memory areas in a machine-readable storage medium.

Discriminator 1100 and/or generator 1200 may each be realized by a neural network, for example, by a series connection of a plurality of fully-connected layers.

Discriminator 1100 produces output variable y and feeds it to a block 1500. Block 1500 optionally transmits the position of switch 1150.

Block 1500 ascertains new parameters P', Q' that are transmitted to first parameter memory 1110 and/or to second parameter memory 1120. New first parameters P' replace current first parameters P in first parameter memory 1110, and/or new second parameters Q' replace current second parameters Q in second parameter memory 1120.

In a flow chart, illustration 4 depicts a specific embodiment of the method, as may be executed in supervision unit 200 shown in FIG. 2.

First, message N is received via CAN bus 300 (2000), and input variable x is extracted (2100) from input block 1000. Discriminator 1100 then determines (2200) (scalar) output variable y from input variable x and first parameters P.

This means that discriminator 1100 implements a typically nonlinear mathematical relationship d $$y = d(x, P) \qquad \text{(formula 1)}.$$

As described, for example, function d may be provided by a neural network.

The comparison (2300) is now made as to whether the value of output variable y exceeds a predefinable threshold value. If this is not the case (2400), it is then decided that there is no anomaly, and error variable F is set to value "0." However, if this is the case (2500), it is decided that there is an anomaly, and error variable F is set to value "1," which results in countermeasures being initiated (2600), for example, by motor vehicle 100 being switched to a safe mode. The method thus ends.

In a flow chart, FIG. 5 illustrates a specific embodiment of the method, as may be executed by device 400 for training discriminator 1100.

First, normal data n are generated by block 1101 (3000), for example, read out from a data file. Random variables r are then generated (3100), for example, likewise read out from a data file (after having been previously generated by a real random number generator). Random variables r are fed to generator 1200, which produces artificial data f as a function of random variables r and second parameters Q (3200).

This means that generator 1200 implements a typically nonlinear mathematical relationship g $$f = g(r, Q) \qquad \text{(formula 2)}.$$

Function g may be provided by a neural network, for example, as described.

Discriminator 1100 may be trained under supervision at this stage (3300): Selecting switch position A, B alternately feeds batches of normal data n, respectively of artificial data f as input variable x to discriminator 1100 and, as described in formula 1, output variables are ascertained.

Thus, by selecting switch position A, B, input variable x is labeled depending on whether input variable x is a normal datum n or an artificial datum f. Therefore, it is self-evidently also possible to feed mixed batches, which contain both normal data n as well as artificial variables f, to the discriminator.

At this stage, a descending gradient method optimizes one of ascertained output variables y of switch position A, B and loss function k(y; P) that is dependent on first parameters P, for example, by back propagation (when discriminator 1100 is provided by a neural network). Loss function k is thereby selected to assume values, which are all the smaller, the more often discriminator 1100 decides that an anomaly exists when artificial data f are fed thereto, and the absence of an anomaly is decided in response to normal data n being fed thereto. This may be accomplished in the exemplary embodiment by loss function k being realized in such a way that output value y of discriminator 1100 is compared to true label A, B for each training point of input data x. This deviation should be small, both in response to artificial data, as well as in response to normal data.

Thus, in each training iteration, new parameter values P* are determined, which approximate the solution to equation $$P^* = \arg\min_P k(y; P),$$

for example, by using a numerical, iterative method. First parameter values P are replaced by new parameter values P*.

Generator 1200 is then trained (3400). Random variables r are generated once more (random variables r already generated above in step 3100 may also be optionally adopted, fed to generator 1200; artificial data f are then generated as a function of current second parameter values Q. Switch 1150 is held in second switch position B, and artificial data f are fed to discriminator 1100. Discriminator 1100 again ascertains output variable y as a function of current first parameter values P. Using a descending gradient method, at this stage, block 1500 determines an optimized second loss function m(y; P, Q) that is dependent on output variable y, first parameters P and second parameters Q.

If discriminator 1100 is configured in such a way that output variable y is interpreted as input variable x likely being normal data n, second loss function m(y;P,Q) may be configured to indicate the likelihood of it being normal data n. Loss function m(y;P,Q) may then be minimized, for example, by back propagation (when discriminator 1100 and generator 1200 are neural networks).

This makes it possible for discriminator 1100 to consider artificial data f produced by generator 1200 to be more likely than normal data n.

Thus, in each training iteration, new second parameter values Q* are determined, which approximate the solution to equation $$Q^* = \arg\min_Q m(y; P, Q),$$

for example, by using a numerical, iterative method. Second parameter values Q are ascertained by new second parameter values Q*.

Preferably, the method branches back to step 3000 and executes steps 3000 to 3400 repeatedly, for example, until a predefinable number of repetitions or a convergence criterion of first parameter value P and/or of second parameter value Q is fulfilled.

The method thus ends.

Variations of the training method are self-evidently possible in order to optimize and/or stabilize the training. For example, it may be provided that, at regular intervals, for example, after a predefinable number of iterations, more batches be used to train discriminator 1100 than generator 1200. Further refinements are possible.

What is claimed is:

1. A method for ascertaining whether there is an anomaly in a communications network, comprising the following steps:
   in a first phase, training a discriminator to recognize whether messages transmitted over the communications network are indicative of an anomaly existing, wherein during the training of the discriminator, normal data and artificial data produced by a generator are fed as an input variable to the discriminator, and the discriminator being trained to recognize that the normal data being fed to the discriminator connotes no anomaly, and the artificial data being fed to the discriminator connotes an anomaly;
   in a second phase, training the generator to produce the artificial data in such a way that, when the artificial data are fed to the discriminator, the discriminator classifies the artificial data as likely to be normal data; and
   in a third phase, feeding contents of messages received over the communications network as an input variable to the discriminator, an output variable being ascertained as a function of the input variable and a decision as to whether the anomaly exists or not being made as a function of the output variable.

2. The method as recited in claim 1, wherein the communication network is a communication network of a motor vehicle.

3. The method as recited in claim 1, wherein the training of the discriminator in the first phase and the training of the generator in the second phase is alternately repeated several times prior to implementation of the third phase.

4. The method as recited in claim 1, wherein, in the second phase, an overall system composed of the generator and the discriminator are being trained and exclusively parameters which characterize the generator are adapted.

5. The method as recited in claim 1, wherein random variables are fed to the generator, and the generator produces the artificial data as a function of the fed random variables.

6. The method as recited in claim 1, wherein, in the first phase, the discriminator is trained using mixed batches that contain both the normal data and the artificial data.

7. The method as recited in claim 1, wherein, in the first phase, the discriminator is alternately trained using batches that exclusively contain the normal data or exclusively contain the artificial data.

8. The method as recited in claim 7, wherein, at a beginning of a first pass through the first phase, the discriminator is initially trained using at least one batch, which exclusively contains the normal data.

9. The method as recited in claim 1, wherein the discriminator and/or the generator is a machine learning system.

10. The method as recited in claim 1, wherein the discriminator and/or the generator is a deep neural network.

11. A non-transitory machine-readable storage medium on which is stored a computer program for ascertaining whether there is an anomaly in a communications network, the computer program, when executed by a computer, causing the computer to perform the following steps:
- in a first phase, training a discriminator to recognize whether messages transmitted over the communications network are indicative of an anomaly existing, wherein during the training of the discriminator, normal data and artificial data produced by a generator are fed as an input variable to the discriminator, and the discriminator being trained to recognize that the normal data being fed to the discriminator connotes no anomaly, and the artificial data being fed to the discriminator connotes an anomaly;
- in a second phase, training the generator to produce the artificial data in such a way that, when the artificial data are fed to the discriminator, the discriminator classifies the artificial data as likely to be normal data; and
- in a third phase, feeding contents of messages received over the communications network as an input variable to the discriminator, an output variable being ascertained as a function of the input variable and a decision as to whether the anomaly exists or not being made as a function of the output variable.

\* \* \* \* \*